AMPLIFYING SYSTEM WITH STAND-BY CHANNEL

Filed Aug. 8, 1950 4 Sheets-Sheet 1

INVENTOR.
JOHN C. KARLSON
BY
S. H. Hartz
ATTORNEY

AMPLIFYING SYSTEM WITH STAND-BY CHANNEL

Filed Aug. 8, 1950 4 Sheets-Sheet 2

INVENTOR.
JOHN C. KARLSON
BY
S H Hartz
ATTORNEY

AMPLIFYING SYSTEM WITH STAND-BY CHANNEL

Filed Aug. 8, 1950 4 Sheets-Sheet 3

INVENTOR.
JOHN C. KARLSON
BY
[signature]
ATTORNEY

Dec. 11, 1956 J. C. KARLSON 2,773,944

AMPLIFYING SYSTEM WITH STAND-BY CHANNEL

Filed Aug. 8, 1950 4 Sheets-Sheet 4

INVENTOR.
JOHN C. KARLSON
BY
ATTORNEY

United States Patent Office 2,773,944
Patented Dec. 11, 1956

2,773,944

AMPLIFYING SYSTEM WITH STAND-BY CHANNEL

John C. Karlson, Brooklyn, N. Y., assignor to Bendix Aviation Corporation, Teterboro, N. J., a corporation of Delaware Application August 8, 1950, Serial No. 178,319

13 Claims. (Cl. 179—171)

The invention relates generally to electrical systems and more particularly to control systems including an amplifier in which failure of one or more parts may result in a serious accident.

In such electrical systems used heretofore, the amplifier may suddenly become inoperative, thus rendering it totally useless, or one or more parts may gradually deteriorate, making it desirable to replace the parts with new ones. Ordinarily, it would be necessary to maintain continuous supervision over the system in order to replace such parts at the proper time.

One object of the present invention is to automatically detect complete inoperativeness of the amplifier or gradual deterioration of any of its parts.

Another object is to provide substantially identical amplifiers for the system and to selectively connect one amplifier operatively in the system and use the other amplifier as a stand-by amplifier.

Another object is to automatically connect the stand-by amplifier operatively in the system when the operating amplifier fails.

Another object is to maintain the stand-by amplifier in condition for immediate operation to avoid delay in transferring from one amplifier to the other.

Another object is to compare the output of the operative amplifier with the output of an identical amplifier so that, should the operative amplifier or its identical counter-part become defective, and the output of one amplifier change relative to the other, the stand-by amplifier will automatically be connected operatively in the circuit.

The invention contemplates a control system including driving means responsive to an error signal. The system includes a pair of identical amplifiers. One of the amplifiers may be operatively connected to the driving means and the other amplifier may be used as a stand-by amplifier to be connected automatically in the circuit should the operating amplifier fail. Each amplifier has a pair of channels receiving the signal and the output of one channel of the operating amplifier is connected to the driving means, and the output of the other channel of the operating amplifier is connected to a dummy load, which closely simulates the load of the driving means. A sensitive switching means is connected to the outputs of both channels of the operating amplifier so that when the outputs of the channels vary from one another a predetermined amount, the switching means operates and connects the stand-by amplifier operatively to the driving means. The stand-by amplifier is instantly ready for operation except that plate voltages are not applied until the amplifier is operatively connected in the circuit.

The foregoing and other objects and advantages of the invention will appear more fully hereinafter from a consideration of the detailed description which follows, taken together with the accompanying drawings wherein two embodiments of the invention are illustrated. It is to be expressly understood, however, that the drawings are for the purposes of illustration and description only, and are not to be construed as defining the limits of the invention.

In the drawings, Figure 1 is a block diagram showing a control system constructed according to the invention;

Figure 1:
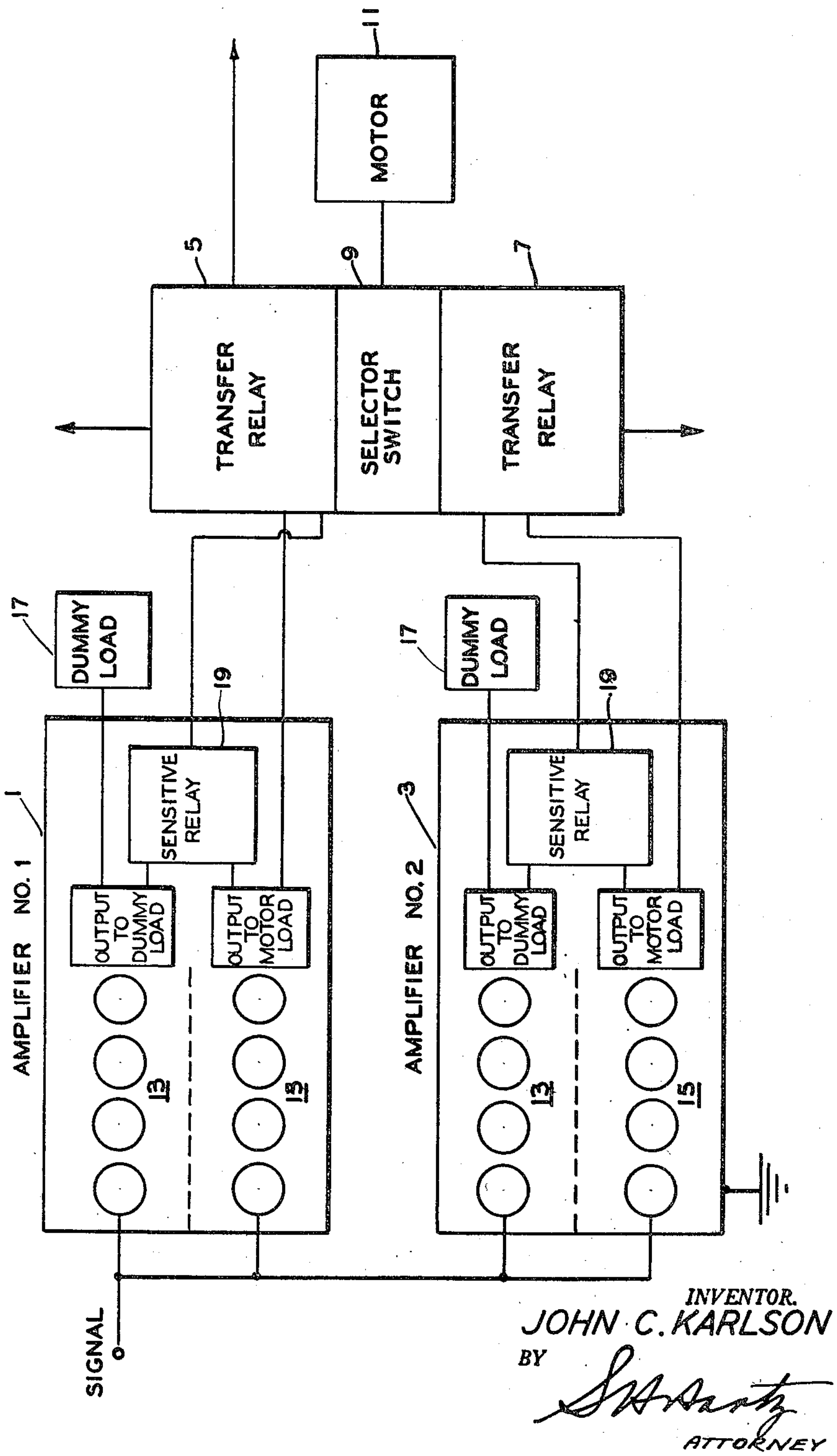

Referring now to the drawings for a more detailed description of the novel control system of the present invention, the control system is shown in Figure 1 as including a pair of identical amplifiers 1, 3 receiving a signal and selectively connected by transfer relays 5, 7 and a selector switch 9 to a servo motor 11 for driving the controls of a ship or other vehicle. One of the amplifiers is connected operatively to the servo motor by the selector switch and transfer relays and the other amplifier serves as a stand-by amplifier to be automatically operatively connected to the servo motor should the operating amplifier fail.

Each amplifier 1, 3 includes a pair of identical channels 13, 15. The output of channel 15 of either amplifier 1, 3 may be operatively connected by transfer relays 5, 7 and selector switch 9 to motor 11, and the output of channel 13 of each amplifier is connected to a dummy load 17 having electrical values corresponding to the motor load. The outputs of the two channels 13, 15 are connected to a sensitive relay 19 which operates the associated transfer relay when the outputs of channels 13 and 15 of the operating amplifier are unequal, to connect the stand-by amplifier to the servo motor.

Unbalance between the outputs of channels 13, 15 may be caused by a deficiency in either channel, such as cathode leakage in one of the tubes or by complete failure of one of the tubes or any of the associated components.

Figure 2:
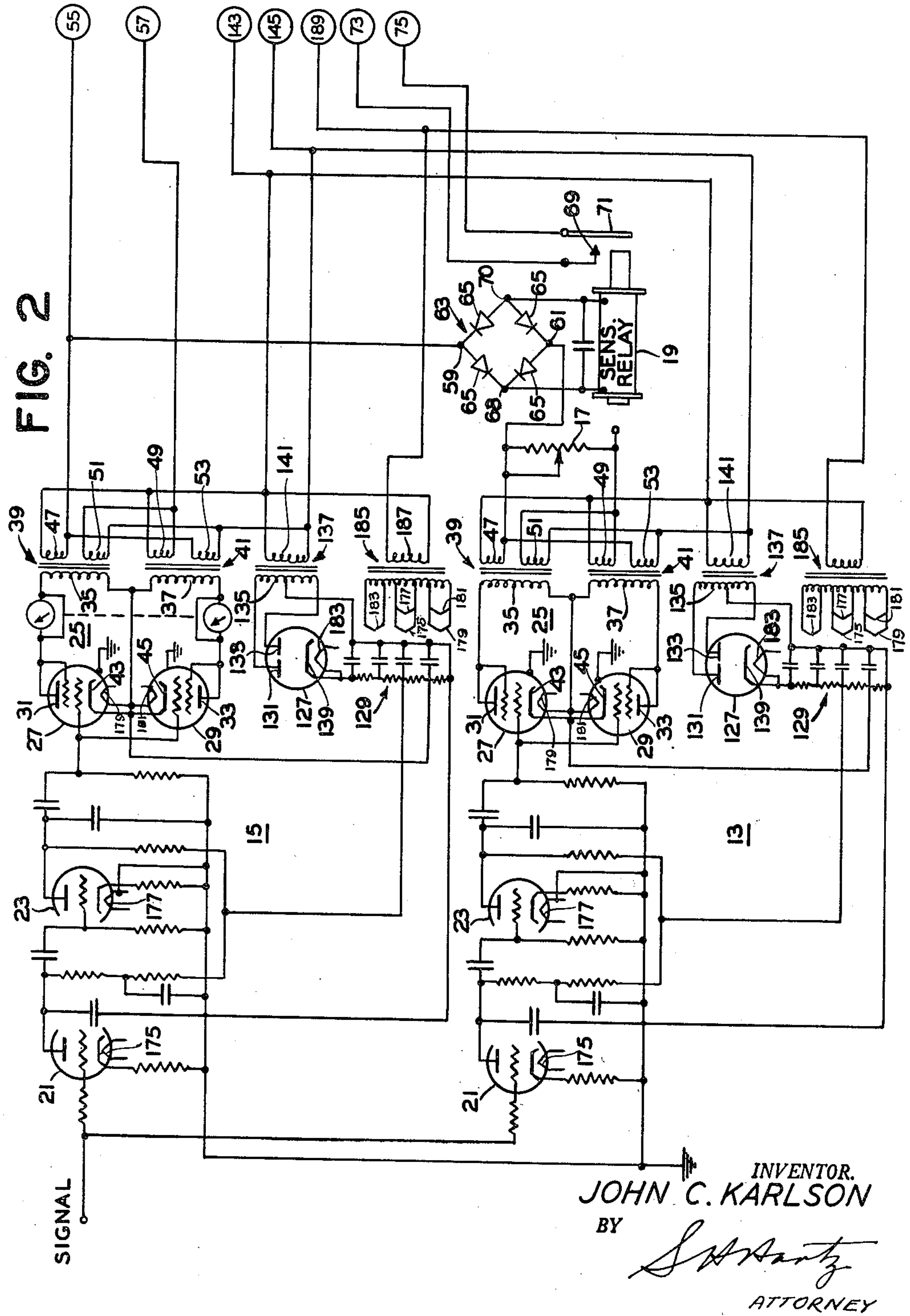
Figure 2 is a detailed wiring diagram of the amplifiers shown schematically in Figure 1.

Referring to Figure 2, each channel 13, 15 includes a pair of amplifying triodes 21, 23 and a discriminator 25 including tubes 27, 29. Primary windings 35, 37 of transformers 39, 41 are connected in the plate circuits of tubes 27, 29. Cathodes 43, 45 of tubes 27, 29 are connected together and to primary windings 35, 37. Secondary winding 47 of transformer 39 and secondary winding 49 of transformer 41 are connected in series with one another, and secondary winding 51 of transformer 39 and secondary winding 53 of transformer 41 are connected in series with one another, and the two secondary windings 51, 53 are connected in parallel with secondary windings 47, 49. The output of channel 15 across windings 47, 49 and 51, 53 is applied to a pair of terminals 55, 57, and when the amplifier is operatively connected in the circuit, its output controls servo motor 11. Dummy load 17 is connected to the output of channel 13 across secondary windings 47, 49 and 51, 53 of transformers 39, 41 and the load may be adjusted to equalize the motor load across terminals 55, 57.

The outputs of channels 13 and 15 are applied across opposite terminals 59, 61 of a rectifier bridge circuit 63. A rectifier 65 is connected in each leg of the bridge. Sensitive relay 19 has its windings electrically connected across opposite terminals 68, 70 of bridge 63. When the outputs of channels 13 and 15 vary, bridge 63 will be unbalanced and sensitive relay 19 will be energized and close its contacts 69, 71.

Figure 3:
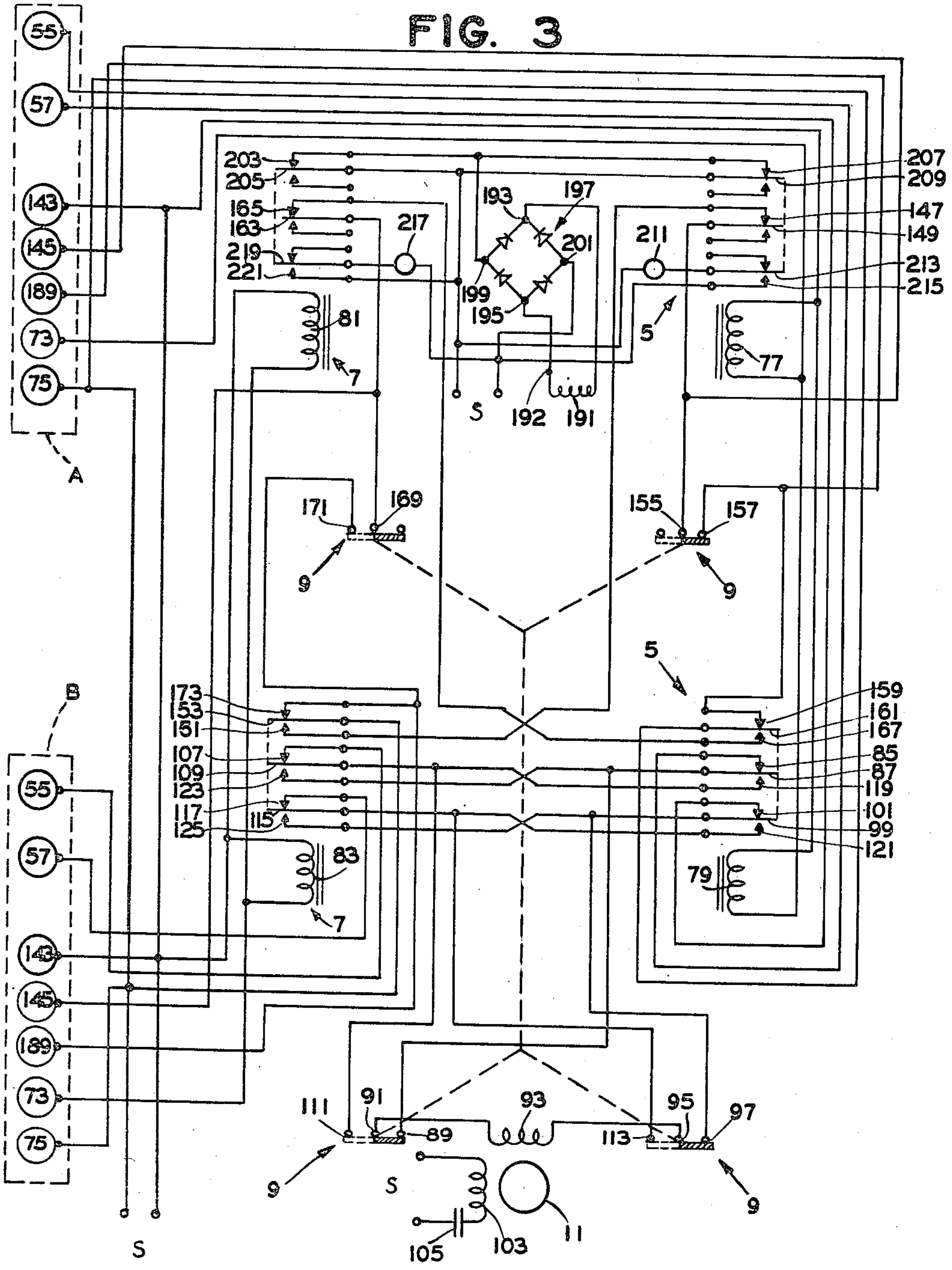
Figure 3 is a schematic wiring diagram showing the switching means of Figure 1.

As shown in Figures 2 and 3, windings 77, 79 of transfer relay 5 are connected in parallel with one another to power source S and in series with contacts 69, 71 of sensitive relay 19 of amplifier 1 through terminals 73, 75 of a connector A. Windings 81, 83 of transfer relay 7 are connected in parallel with one another to power source S and in series with contacts 69, 71 of sensitive relay 19 of amplifier 3 through terminals 73, 75 of a connector B. When the contacts 69, 71 of sensitive relay 19 of amplifier 1 or amplifier 3 close, the associated transfer relay 5 or 7 operates. Each transfer relay 5, 7 may comprise two three-pole double-throw switches of the mechanical latching type which remain in closed position after the relay windings have been energized. Selector switch 9 may comprise a four-pole double-throw switch.

The output from channel 15 of amplifier 1 is connected through terminal 55 of connector A and normally closed contacts 85, 87 of relay 5 and contacts 89, 91 of selector switch 9 to one end of the variable phase winding 93 of motor 11. The opposite end of variable phase winding 93 is connected through contacts 95, 97 of selector switch 9 and normally closed contacts 99, 101 of transfer relay 5 and terminal 57 of connector A to channel 15 of amplifier 1. The fixed phase 103 of motor 11 is energized by source S through a phase shifting condenser 105.

The output of channel 15 of amplifier 3 is connected through terminal 55 of connector B and normally closed contacts 107, 109 of relay 7 and contacts 111, 91 of selector switch 9 to one end of variable phase winding 93 of motor 11. The opposite end of variable phase winding 93 is connected through contacts 113, 95 of selector switch 9 and normally closed contacts 115, 117 of transfer relay 7 to terminal 57 of connector B to channel 15 of amplifier 3. The output from channel 15 of amplifier 1 or of amplifier 3 may be selectively connected to control motor 11 by closing contacts 89, 91 and 95, 97 of selector switch 9, as shown in solid lines in Figure 3, to connect amplifier 1 to the variable phase 93 of motor 11, or by closing contacts 91, 111 and 95, 113 of selector switch 9, as shown in dotted lines in Figure 3, to connect amplifier 3 to the variable phase winding 93 of motor 11.

Contacts 119, 121, 87 and 99 of relay 5 are connected to contacts 109, 115, 123, 125, respectively, of relay 7. With this arrangement, if the output of amplifier 1 across terminals 55, 57 of connector A is connected operatively to motor 11 and the amplifier fails, then relay 5 will be energized and automatically connect the output of amplifier 3 across terminals 55, 57 of connector B operatively to motor 11 through contacts 119, 87, and 99, 121 of relay 5. Likewise, if the output of amplifier 3 across terminals 55, 57 of connector B is connected operatively to motor 11 and the amplifier fails, then relay 7 will be energized to automatically connect the output of amplifier 1 across terminals 55, 57 of connector A operatively to motor 11 through contacts 123, 109 and contacts 115, 125 of relay 7.

In Figure 2, the plate potential for tubes 21, 23, 27, 29 of each amplifier channel is provided by rectifying the voltage from alternating current source S by a full wave rectifier tube 127 and passing the rectified current through a filter 129. Plates 131, 133 of tube 127 are connected to the opposite ends of center-tapped secondary winding 135 of a transformer 137, and the cathode 139 of tube 127 is connected to the center-tap. Primary winding 141 of transformer 137 is connected to terminals 143, 145.

Terminals 143 of both amplifiers 1 and 3 (Figure 3) are connected through connectors A and B to one side of source S. Terminal 145 of amplifier 1 may be connected through connector A to the other side of source S by one of two parallel paths, one path including normally closed contacts 147, 149 of transfer relay 5 and normally open conttacts 151, 153 of transfer relay 7, and the other path including contacts 155, 157 of selector switch 9 and normally closed contacts 159, 161 of transfer relay 5.

Likewise, terminal 145 of amplifier 3 may be connected through connector B to the latter side of power source S through one of two parallel paths, one path including normally closed contacts 163, 165 of relay 7 and normally open contacts 167, 161 of transfer relay 5, and the other path including contacts 169, 171 of selector switch 9 and normally closed contacts 173, 153 of transfer relay 7. With this arrangement, plate voltage is applied only to the operative amplifier and the plate circuit of the stand-by amplifier is de-energized.

Cathode heaters 175, 177, 179, 181 and 183 of tubes 21, 23, 27, 29 and 127, respectively, of each amplifier channel (Figure 1) are energized by source S through a transformer 185 having its primary winding 187 connected to terminals 189, 143. As above described, terminals 143 of both amplifiers 1 and 3 are connected to one side of power source S. Terminal 189 of amplifier 1 is connected to the other side of power source S through connector A and through normally closed contacts 159, 161 of transfer relay 5. Terminal 189 of amplifier 3 is connected to the latter side of the power source through connector B and through normally closed contacts 173, 153 of transfer relay 7. With this arrangement, the filament heaters of both amplifiers are energized at all times so that the stand-by amplifier is in condition for immediate operation to avoid delay in transferring from one amplifier to the other.

An electromagnetic clutch having a winding 191 drivingly connects motor 11 with the controls of the ship or craft on which the device is used, and the winding is connected across opposite terminals 193, 195 of a rectifying bridge circuit 197 corresponding generally to rectifying bridge circuits 63 in amplifiers 1 and 3. The other two opposing terminals 199, 201 of bridge circuit 197 are connected to power source S through normally closed contacts 203, 205 of transfer relay 7 and normally closed contacts 207, 209 of transfer relay 5 in parallel. Clutch winding 191 is energized when either amplifier 1 or amplifier 3 is operatively connected in the control system, and is de-energized only when both transfer relays 5 and 7 are energized, which condition would occur only if both amplifiers 1 and 3 were defective. A manual switch 192 may be included in the circuit to de-energize the clutch winding.

An audible or visual alarm 211 for amplifier 1 may be connected to power source S through normally open relay contacts 213, 215 of transfer relay 5, and an audible or visual alarm 217 for amplifier 3 may be connected to source S through normally open contacts 219, 221 of transfer relay 7. The alarm will be energized upon operation of the associated transfer relay to indicate that the associated amplifier is not functioning.

*Operation*

Amplifier 1 or amplifier 3 is connected operatively in the control system by closing the associated contacts of selector switch 9. If amplifier 1 is to be connected operatively in the control system and amplifier 3 is to be used as the stand-by amplifier, then the selector switch contacts are moved to the positions shown in solid lines in Figure 3. The output of amplifier 1 appearing across terminals 55, 57 of connector A is impressed on variable phase winding 93 of motor 11 from terminal 55, through contacts 85, 87 of transfer relay 5, contacts 89, 91 of selector switch 9, through field winding 93, contacts 95, 97 of selector switch 9, contacts 99, 101 of transfer relay 5 to terminal 57.

Plate voltages are applied to the tubes of both channels of amplifier 1 through terminals 143, 145 of connector A connected to source S through contacts 155, 157 of selector switch 9 and contacts 159, 161 of transfer relay 5. The cathode heaters of the tubes of both channels of amplifier 1 are energized by power source S through terminals 189, 143 of connector A connected to the power source through contacts 159, 161 of transfer relay 5.

The cathode heaters of the tubes of both channels of amplifier 3 are energized by power source S through terminals 189, 143 of connector B through contacts 173, 153 of transfer relay 7. The output of amplifier 3 across terminals 55, 57 of connector B is disconnected from the variable phase winding 93 of motor 11, and the plate circuits of both channels of amplifier 3 are disconnected from source S.

If a tube or other part in channel 13 or 15 of amplifier 1 becomes defective, then the relative outputs of channels 13 and 15 will vary and operate the associated sensitive relay 19 and energize windings 77, 79 of transfer relay 5. The output of amplifier 1 across terminals 55, 57 of connector A will be disconnected from variable phase winding 93 of motor 11 by opening contacts 85, 87 and 99, 101 of transfer relay 5. The plate circuits and cathode heater circuits of the tubes of amplifier 1 will be disconnected from power source S by opening contacts 159, 161 of transfer relay 5. Alarm 211 will be energized by power source S by closing contacts 213, 215 of transfer relay 5.

The cathode heaters of the tubes of both channels of amplifier 3 continue to be energized by power source S after operation of relay 5 through contacts 173, 153 of transfer relay 7. Plate voltages are applied to the tubes of both channels of amplifier 3 by source S after operation of relay 5 through terminals 143, 145 of connector B, contacts 163, 165 of transfer relay 7, and contacts 167, 161 of transfer relay 5.

The output of amplifier 3 appearing across terminals 55, 57 of connector B is automatically connected to variable phase winding 93 of motor 11 from terminal 55, through contacts 107, 109 of transfer relay 7, contacts 119, 87 of transfer relay 5, contacts 89, 91 of selector switch 9 through winding 93, contacts 95, 97 of selector switch 9, contacts 99, 121 of transfer relay 5, contacts 115, 117 of transfer relay 7 to terminal 57. Stand-by amplifier 3 becomes the operative amplifier after operation of transfer relay 5 even though selector switch 9 remains in its original position.

If amplifier 3 is to be connected operatively in the control system and amplifier 1 is to be used as the standby amplifier, then the selector switch contacts are moved to the positions shown in dotted lines in Figure 3. The output of amplifier 3 appearing across terminals 55, 57 of connector B is impressed on variable phase winding 93 of motor 11 from terminal 55 through contacts 107, 109 of transfer relay 7, contacts 111, 91 of selector switch 9, through field winding 93, contacts 95, 113 of selector switch 9, contacts 115, 117 of transfer relay 7 to terminal 57.

Plate voltages are applied to the tubes of both channels of amplifier 3 through terminals 143, 145 of connector B connected to source S through contacts 169, 171 of selector switch 9 and contacts 173, 153 of transfer relay 7. The cathode heaters of the tubes of both channels of amplifier 3 are energized by power source S through terminals 189, 143 of connector B connected to the power source through contacts 173, 153 of transfer relay 7.

The cathode heaters of the tubes of both channels of amplifier 1 are energized by power source S through terminals 189, 143 of connector A connected to the power source through contacts 159, 161 of transfer relay 5. The output of amplifier 1 across terminals 55, 57 of connector A is disconnected from the variable phase winding 93 of motor 11, and the plate circuits of both channels of amplifier 1 are disconnected from source S.

If a tube or other part in channel 13 or 15 of amplifier 3 becomes defective, then the relative outputs of channels 13 and 15 will vary and operate the associated sensitive relay 19 and energize windings 81, 83 of transfer relay 7. The output of amplifier 3 across terminals 55, 57 of connector B will be disconnected from variable phase winding 93 of motor 11 by opening contacts 107, 109 and 115, 117 of transfer relay 7. The plate circuits and cathode heater circuits of the tubes of amplifier 3 will be disconnected from power source S by opening contacts 173, 153 of transfer relay 7. Alarm 217 will be energized by power source S by closing contacts 219, 221 of transfer relay 7.

The cathode heaters of the tubes of both channels of amplifier 1 continue to be energized by power source S after operation of relay 7 through contacts 159, 161 of transfer relay 5. Plate voltages are applied to the tubes of both channels of amplifier 1 through terminals 143, 145 of connector A connected to source S through contacts 149, 147 of transfer relay 5 and contacts 151, 153 of transfer relay 7.

The output of amplifier 1 appearing across terminals 55, 57 of connector A is automatically connected to variable phase winding 93 of motor 11 from terminal 55 through contacts 85, 87 of transfer relay 5, contacts 123, 109 of transfer relay 7, contacts 111, 91 of selector switch 9, through winding 93, contacts 95, 113 of selector switch 9, contacts 115, 125 of transfer relay 7, and contacts 99, 101 of transfer relay 5, to terminal 57.

The control system will continue to operate satisfactorily when the operating amplifier fails as long as the stand-by amplifier is in operating condition. When one of the amplifiers becomes defective, as indicated by the alarm, then a new amplifier may be substituted therefor or the defective part may be replaced without interrupting operation of the system.

With the arrangement described, either complete inoperativeness of one of the amplifiers or gradual deterioration of any of its parts may be automatically detected.

The system described will also detect improper phase relation between the error signal and the alternating power source S. The normal threshold voltage across the sensitive relay would be higher than normally under such conditions and the relay would operate.

Either of the amplifiers may be used as the operative amplifier by closing the proper contacts of selector switch 9.

Figure 4:
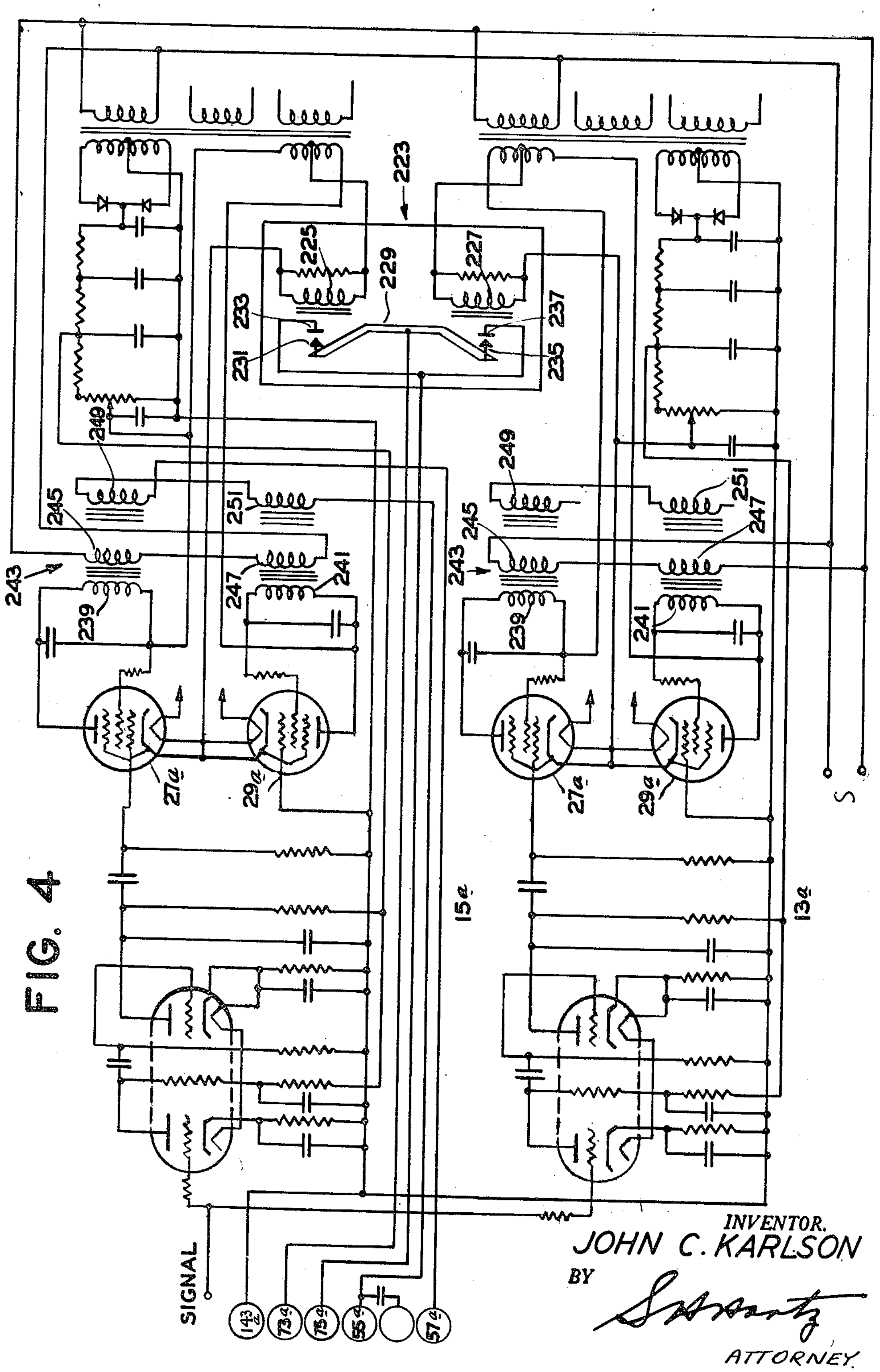
Figure 4 is a modification of an amplifier constructed according to the invention.

The amplifier shown in Figure 4 is substantially like the amplifier shown in Figure 2 except that the amplifier of Figure 4 has a differential relay 223 having a pair of windings 225, 227 and a pivoted armature 229. Winding 225 is connected across the output of channel **15*a* of the amplifier and winding 227 is connected across the output of channel 13*a* of the amplifier. When the output of one channel varies from the output of the other channel, relay armature 229 will pivot and close contacts 231, 233 or contacts 235, 237 connected to terminals 73*a*, 75*a*. Terminals 73*a* and 75*a* are adapted to be connected to terminals 73 and 75 of connectors A and B, as described in connection with amplifiers 1 and 3, so that upon closing of contacts 231, 233 or contacts 235, 237 of one or the other amplifier connected to connectors A and B, one or the other transfer relay 5 or 7 will operate. Also, in the amplifier of Figure 4, the output of discriminator tubes 27*a*, 29*a* is applied to the control windings 239, 241 of a magnetic amplifier 243. Primary windings 245, 247 of the magnetic amplifier are energized from alternating current source S and secondary windings 249, 251 of magnetic amplifier 243 of channel 15*a* are connected to terminals 55*a*, 57*a* for connection to terminals 55, 57 of connector A and connector B. Magnetic amplifier 243 of channel 13*a* corresponds to dummy load 17 of amplifiers 1 and 3 since the secondary windings 249, 251** are open circuited.

The operation of the amplifier shown in Figure 4 in connection with the circuit shown in Figure 3 is substantially the same as for amplifiers 1 and 3.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In an electrical system, a stand-by amplifier having at least one channel, an operating amplifier having a pair of channels, controlled means connected to only one channel of said operating amplifier, and means connected to both channels of said operating amplifier and sensitive to variations in the relative outputs of said channels, said means connecting said controlled means to said stand-by amplifier when the outputs of the channels of said operating amplifier vary relative to one another a predetermined amount.

2. In an electrical system, an operating amplifier having a pair of channels, controlled means connected to one channel of said operating amplifier, a dummy load connected to the other channel of said operating amplifier, means connected to both channels of said operating amplifier and sensitive to a variation in the relative outputs of said channels, a stand-by amplifier having at least one channel corresponding to the channel connected to the controlled means, and said sensitive means connecting said controlled means to said stand-by amplifier with variation in the relative outputs of said operating amplifier channels.

3. In an electrical system adapted to receive a variable signal, an operating amplifier having a pair of channels adapted to receive the signal, controlled means connected to one channel of said operating amplifier, a dummy load simulating the load of said controlled means and connected to the other channel of said operating amplifier, a stand-by amplifier having at least one channel corresponding to the channel connected to the controlled means and adapted to receive the signal, a source of plate voltage for said amplifiers and connected to said operating amplifier only, means connected to both channels of said operating amplifier and sensitive to variations in the relative outputs of said channels, said sensitive means connecting said controlled means and said source of plate voltage to said stand-by amplifier when the outputs of the channels of said operating amplifier vary relative to one another a predetermined amount.

4. In an electrical system, a stand-by amplifier, an operating amplifier having a pair of channels, each of said amplifiers including at least one electron tube having a heated cathode and a plate, means connected to both channels of said operating amplifier and sensitive to variations in the relative outputs of said channels, a source of cathode heater current for said tubes connected to both of said amplifiers, a source of plate voltage for said tubes connected to said operating amplifier only, controlled means connected to the output of one channel of said operating amplifier, said sensitive means connecting said plate voltage source and said controlled means to said stand-by amplifier when the output of one channel of said operating amplifier varies a predetermined amount relative to the output of the other channel of said operating amplifier.

5. In an electrical system adapted to receive a signal, an operating amplifier having a pair of channels adapted to receive the signal, controlled means connected to the output of one channel of said operating amplifier, a dummy load simulating the load of said controlled means and connected to the output of the other channel of said operating amplifier, a stand-by amplifier having a channel corresponding to the channel of said operating amplifier connected to said controlled means and adapted to receive the signal, a source of cathode heater current connected to both of said amplifiers, a source of plate voltage connected to said operating amplifier only, means connected to both channels of said operating amplifier and sensitive to a variation in the relative outputs of said channels, said sensitive means disconnecting the operating amplifier from said controlled means and from said source of plate voltage and from said source of cathode heater current and connecting said stand-by amplifier to said controlled means and to said source of plate voltage when the output of one channel of said operating amplifier varies a predetermined amount relative to the output of the other channel of said operating amplifier.

6. In an electrical system, a pair of amplifiers each having a pair of channels, means connected to both channels of each amplifier and sensitive to variations in the relative outputs of said channels, and controlled means selectively connected operatively to the output of one channel of one of said amplifiers, said sensitive means connecting said controlled means to the corresponding channel of said other amplifier when the output of one channel of said operating amplifier varies a predetermined amount relative to the output of the other channel of said operating amplifier.

7. In an electrical system, a pair of amplifiers each having a pair of channels, means connected to both channels of each amplifier and sensitive to variations in the relative outputs of said channels, a dummy load connected to the output of one channel of each of said amplifiers, and controlled means selectively connected operatively to the output of the other channel of one of said amplifiers, said sensitive means connecting said controlled means to the corresponding channel of said other amplifier when the output of one channel of said operating amplifier varies a predetermined amount relative to the output of the other channel of said operating amplifier.

8. In an electrical system, controlled means, a pair of amplifiers each having a pair of channels, means for selectively connecting said controlled means operatively to the output of one channel of one of said amplifiers, a pair of sensitive relays so arranged that each amplifier has a sensitive relay connected across the outputs of both its channels, and means operable by the relay of said one of said amplifiers connecting said controlled means to the corresponding channel of the other amplifier when the output of one channel of said one of said amplifiers varies from the output of the other channel of said one of said amplifiers.

9. In an electrical system, a pair of amplifiers each having a pair of substantially identical channels, controlled means, a dummy load closely simulating the load of said controlled means connected to the output of one channel of each of said amplifiers, selector means for connecting said controlled means operatively to the output of the other channel of one of said amplifiers, sensitive means for each amplifier responsive to the outputs of both of said channels, said sensitive means of said operating amplifier operating when the output of one channel of said operating amplifier varies a predetermined amount from the output of the other channel of said operating amplifier, and transfer means responsive to said sensitive means for connecting said controlled means to the corresponding channel of the other amplifier when said sensitive means operates.

10. In an electrical system, a pair of amplifiers each having a pair of channels including at least one electron tube having a cathode and a plate, a source of plate voltage for said tubes, controlled means, selector means for connecting said controlled means operatively to the output of one channel of one of said amplifiers and for connecting said plate voltage to the tubes of both channels of said amplifier, sensitive means for each amplifier responsive to the outputs of both of said channels, said sensitive means of said operating amplifier operating when the output of one channel of said operating amplifier varies a predetermined amount from the output of the other channel of said operating amplifier, and transfer means responsive to said sensitive means for disconnecting said operating amplifier from said controlled means and said plate voltage source and for connecting said other amplifier thereto when said sensitive means operates.

11. In an electrical system, a stand-by amplifier having at least one channel, an operating amplifier having a pair of channels, controlled means connected to only one channel of said operating amplifier, means connected to both channels of said operating amplifier and sensitive to variations in the relative outputs of said channels including a rectifying bridge circuit connected to the output of said both channels and sensitive to variations in the relative outputs of said channels and a relay connected to said bridge circuit, said means connecting said controlled means to said stand-by amplifier when the outputs of the channels of said operating amplifier vary relative to one another a predetermined amount.

12. In an electrical system, an operating amplifier having a pair of channels, controlled means connected to one channel of said operating amplifier, a dummy load connected to the other channel of said operating amplifier, means connected to both channels of said operating amplifier and sensitive to a variation in the relative outputs of said channels, and a stand-by amplifier having at least one channel corresponding to the channel connected to the controlled means, said sensitive means connecting said controlled means to said stand-by amplifier with variations in the relative outputs of said operating amplifier channels, said sensitive means including a rectifying bridge circuit connected to the output of both channels and sensitive to variations in the relative outputs of said channels and a relay connected to said bridge circuit and adapted to disconnect the controlled means from said operating amplifier when the output of one channel varies a predetermined amount relative to the output of the other channel.

13. In an electrical system an operating amplifier having a pair of channels, controlled means connected to one channel of said operating amplifier, a dummy load connected to the other channel of said operating amplifier, means connected to both channels of said operating amplifier and sensitive to a variation in the relative outputs of said channels, and a stand-by amplifier having at least one channel corresponding to the channel connected to the controlled means, said sensitive means connecting said controlled means to said stand-by amplifier with variations in the relative outputs of said operating amplifier channels, said sensitive means including a differential relay having a pair of windings, one winding being connected to the output of one of said pair of channels and the other winding being connected to the output of the other of said pair of channels, said differential relay being sensitive to variations in the relative outputs of said channels and adapted to disconnect the controlled means from the amplifier when the output of one of said pair of channels varies a predetermined amount relative to the output of the other channel.

References Cited in the file of this patent

UNITED STATES PATENTS

| | | |
|---|---|---|
| 1,462,057 | Wold | July 17, 1923 |
| 1,666,154 | Toomey | Apr. 17, 1928 |
| 1,788,513 | Fultz | Jan. 13, 1931 |
| 1,809,637 | Moulton | June 9, 1931 |
| 2,229,089 | Kinsburg | Jan. 21, 1941 |
| 2,229,158 | Wilson | Jan. 21, 1941 |
| 2,245,383 | Brokaw | June 10, 1941 |
| 2,246,310 | Lenehan | June 17, 1941 |
| 2,270,771 | Schonfeld | Jan. 20, 1942 |
| 2,390,869 | Carter | Dec. 11, 1945 |

FOREIGN PATENTS

| | | |
|---|---|---|
| 484,287 | Great Britain | May 3, 1938 |
| 114,259 | Australia | Dec. 4, 1941 |